United States Patent [19]

Klose et al.

[11] Patent Number: 4,809,262

[45] Date of Patent: Feb. 28, 1989

[54] METHOD OF MAKING CONFERENCE CALL CONNECTIONS IN COMPUTER-CONTROLLED DIGITAL TELEPHONE EXCHANGES

[75] Inventors: Reinhard Klose; Jürgen Schröter, both of Berlin, Fed. Rep. of Germany

[73] Assignee: Deutsche Telephonwerke und Kabelindustrie AG, Berlin, Fed. Rep. of Germany

[21] Appl. No.: 158,574

[22] Filed: Feb. 22, 1988

[30] Foreign Application Priority Data

Feb. 23, 1987 [DE] Fed. Rep. of Germany ....... 3706128

[51] Int. Cl.$^4$ ............................................. H04Q 11/04
[52] U.S. Cl. ..................................... 370/62; 370/109; 379/202
[58] Field of Search ................ 370/62, 110.1, 58, 109; 379/202, 206

[56] References Cited

U.S. PATENT DOCUMENTS

| 4,393,496 | 7/1983 | Zertraeg | 370/62 |
| 4,479,211 | 10/1984 | Bass et al. | 370/62 |
| 4,748,618 | 5/1988 | Brown et al. | 379/202 |

Primary Examiner—Douglas W. Olms
Assistant Examiner—Frank Scutch
Attorney, Agent, or Firm—Herbert L. Lerner; Laurence A. Greenberg

[57] ABSTRACT

A method of making conference call connections in computer-controlled telephone exchanges includes combining voice signals of conference participants on a digital basis, forming a signal of a total of speaking levels of a given number of the most active participants, distributing the signal in an undamped manner, and suppressing voice signals of the inactive participants. A bit stream of the conference participants reaching a conference assembly through an incoming line is distributed to m adding processors having n channels each, and the PCM words are linearized with a code table and stored in level memories for each particular participant. A total of the linear values is formed, is added to individual participant evaluation totals and is stored in evaluation memories for each particular participant. The participant evaluation totals are transmitted to an evaluation processor which determines active channels by using a delayed mean value of the participant levels and transmits it to the adding processors. A conference total signal is created by adding linear values of all channels. Transmission signals for all channels are formed in the adding processors by compressing the conference total signal, the individual linear value of the active participants being substracted before compression. The signals thus created are stored in transmitting memories and transmitted through an outgoing line.

10 Claims, 1 Drawing Sheet

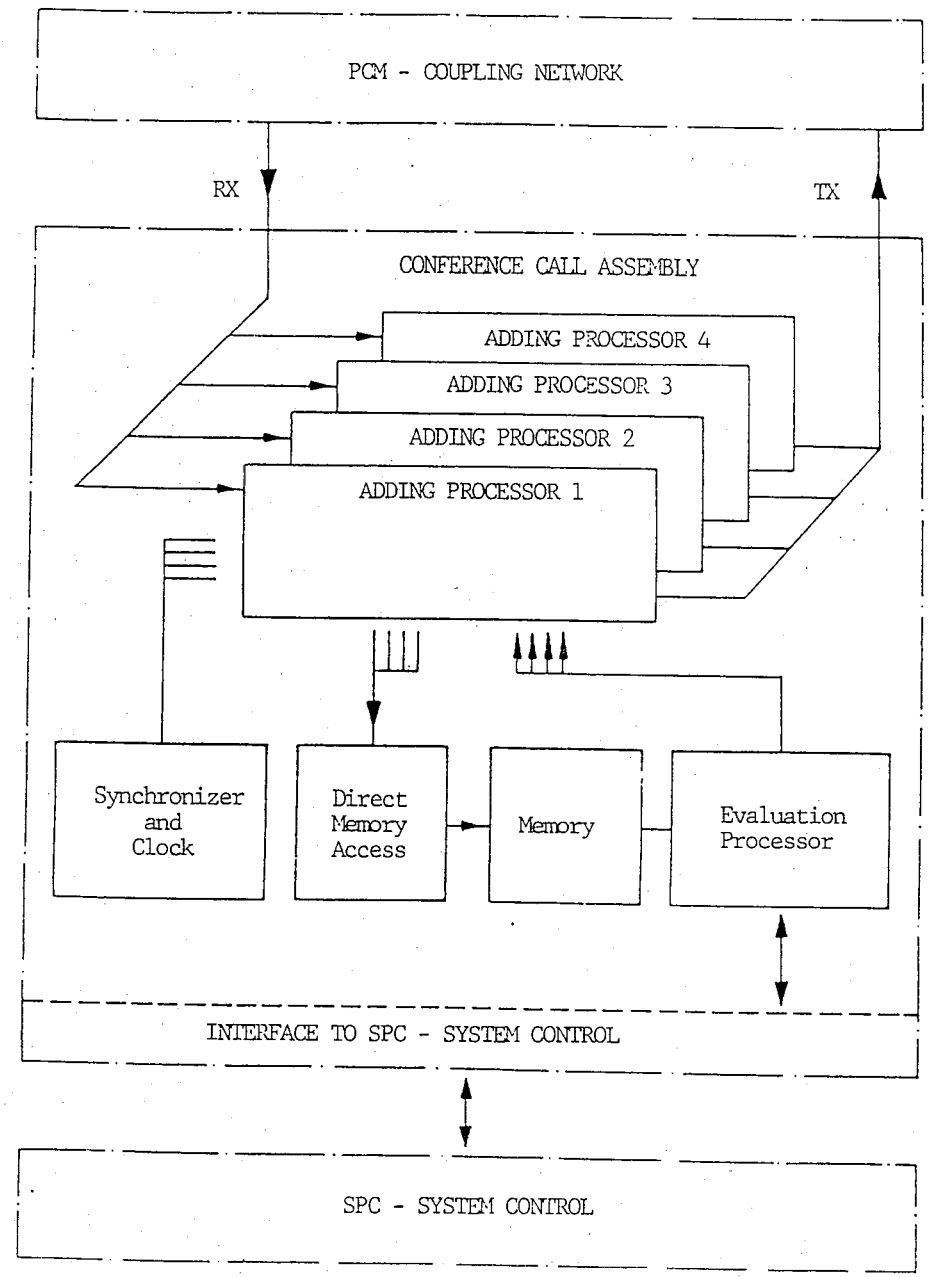

019
METHOD OF MAKING CONFERENCE CALL CONNECTIONS IN COMPUTER-CONTROLLED DIGITAL TELEPHONE EXCHANGES

BACKGROUND OF THE INVENTION

The invention relates to a method of making conference call connections in computer-controlled telephone exchanges which combines the voice signals of the conference participants on a digital basis, forms a signal of the total of the speaking levels of a certain number of the most active participants as well as distributes it in an undamped manner, and suppresses the voice signals of the inactive participants.

In computer-controlled telephone exchanges which provide connections for telephone conferences, it is known to store a user authorization as well as to monitor the number of the connected parties and to control them by means of different memories, in such a way that, for example, a maximum number of four parties is simultaneously connected, as disclosed in German Published, Non-Prosecuted Application DE-OS No. 32 06 830.

In order to permit a larger group of people, who may also be subscribers in various local exchanges within or outside of the country, to participate in a conference, a method was proposed which assigns groups of conference callers to public exchanges, as described in German Pat. DE-PS No. 35 15 646. The voice channels are switched on or off by a program in the associated group processor in which a suitable pattern for a conference call connection with the ariving levels for each conference port is stored. A check and new level determination is performed with each new level message. As a result it may be necessary to limit the flow of data from the group processor in order to preserve the computing capacity thereof for the control functions.

SUMMARY OF THE INVENTION

It is accordingly an object of the invention to provide a a method of making conference call connections in computer-controlled digital telephone exchanges, which overcomes the hereinafore-mentioned disadvantages of the heretofore-known methods of this general type, which provides a method for interconnecting participants in a conference which provides an undamped interconnection of at most three speakers and in which the determination of the active channels as well as the interconnection thereof is provided by the hardware in the conference call component and which is usable for all types of conference calls of the exchange system, regardless of the number of conference participants.

With the foregoing and other objects in view there is provided, in accordance with the invention, a method of making conference call connections in computer-controlled telephone exchanges, which includes combining voice signals of conference participants on a digital basis, forming a signal of a total of speaking levels of a given number of the most active participants, distributing the signal in an undamped manner, and suppressing voice signals of the inactive participants, wherein the improvement comprises distributing a bit stream of the conference participants reaching a conference assembly through an incoming line to m adding processors having n channels each, linearizing PCM words by means of a code table, storing the PCM words in level memories for each particular participant; forming a total of the linear values, adding the total of the linear values to individual participant evaluation totals, and storing the total of the linear values in evaluation memories for each particular participant; transmitting the participant evaluation totals to an evaluation processor which determines active channels by using a delayed average value of the participant levels and which transmits the active channels to the adding processors; creating a conference total signal by adding linear values of all channels; subtracting the individual linear value of the active participants, subsequently forming transmission signals for all channels in the adding processors by compressing the conference total signal; storing the signals thus created in transmitting memories, and transmitting the signals through an outgoing line.

In accordance with another feature of the invention, there is provided a method which comprises forming the participant evaluation total by the integration of n linearized PCM words of an adding processor.

In accordance with a further feature of the invention, there is provided a method which comprises reducing the integrated participant evaluation total to 1/n after exactly n PCM frames, and adding the integrated participant evaluation total to an integrated participant level reduced to (n−1)/n, for the formation of a delayed average value.

In accordance with an added feature of the invention, there is provided a method which comprises immediately switching a channel from an inactive state to an active state, and switching a channel from the active state into the inactive state with a delay.

In accordance with a concomitant feature of the invention, there is provided a method which comprises keeping the channel which was last switched-on in the active state, during the inactive state of all channels.

Other features which are considered as characteristic for the invention are set forth in the appended claims.

Although the invention is illustrated and described herein as embodied in a method of making conference call connections in computer-controlled digital telephone exchanges, it is nevertheless not intended to be limited to the details shown, since various modifications and variations may be made therein without departing from the spirit of the invention and within the scope and range of equivalents of the claims.

The method of operation of the invention, however, together with additional objects and advantages thereof will be best understood from the following description of specific embodiments when read in connection with the accompanying drawing.

BRIEF DESCRIPTION OF THE DRAWING

The drawing is a block circuit diagram illustrating the method according to the invention.

DESCRIPTION OF PREFERRED EMBODIMENT

Referring now to the single FIGURE of the drawing in detail, there is seen a conference call assembly connected to a PCM coupling network of a computer-controlled digital exchange. User signals reach an incoming line RX of the conference call assembly through the coupling network. Outgoing conference signals from the conference call assembly are again transmitted through an outgoing line TX to the coupling network and from there to the participants.

As is usual in PCM time-multiplex exchanges, the incoming bit stream is divided into 32 channels per frame, each frame having 256 bits. Each speech specimen is coded in one PCM word with 8 bits.

The device shown in the block diagram is capable of forming four conference groups independently of each other and each having up to eight participants.

The serial bit stream arriving through the incoming line RX simultaneously reaches four adding processors. Eight channels which are controlled by a synchronizer, are assigned to each adding processor and are operated during one pulse frame (125 us).

The adding processors contain one receiving memory, one transmitting memory, one evaluation memory and one level memory for each participant.

The eight PCM words read in by one adding processor are linearized with the aid of a code table and are stored in a receiving memory for a particular participant.

In order to measure the intensity of speech of the participants, the totals of the linear values are formed and added to the evaluation totals of the individual participants. With the aid of the evaluation totals of the participants derived from the magnitude of the speaking level, the evaluation processor decides which voice channels are active (the loudest), i.e. those which must be distributed in the direction of transmission.

Based on an activation word read in by an evaluation processor, the linear values in the associated receiving memory of the adding processor are replaced by zero for the inactive channels, i.e. no participant is connected or the participant himself is inactive.

A conference total signal is then formed by adding the linear values of the channels of all adding processors, including those channels with zero values.

The transmission signals for all eight channels are formed in each adding processor by compressing the conference total signal for inactive participants. For active participants, the individual linear value is subtracted from the conference total signal before compression. If the conference total signal exceeds the value range preset according to the companding characteristic of the PCM system, the signal is limited to a maximally permissible value in order to keep distortions as small as possible. The PCM words thus formed are stored in the transmitting memory and are serially transmitted in the next frame by the adding processor through the outgoing line TX.

The participant evaluation totals mentioned above are formed by integrating eight linearized PCM words, for example. The amplitude alone is taken into account, not the operational sign.

While being controlled by a frame counter, each participant evaluation total is reduced to ⅛ of the value thereof after eight frames (1 ms) and is added to an integrated participant level reduced by ⅞. The participant evaluation total then is deleted from the evaluation memory. Thus the integrated participant level forms a delayed average value of the speaking intensity of the participant. The integrated participant levels reduced to 1/256 are read into the memory of the evaluation processor through direct memory access (DMA) at an interval of 8 ms. This reduction produces a constant lower threshold which suppresses the noise present in the line to a large degree. Otherwise this noise would cause a continuous and objectionable switching between the individual channels, unless three participants just happened to speak.

The three active participants are then determined by the evaluation processor in the following manner: If the newly read-in participant level is greater than the participant level stored in the evaluation processor, the newly read-in participant level is stored.

If the newly read-in participant level is smaller than the one stored in the evaluation processor, the stored participant level is decremented by a preset value.

By means of this type of evaluation of the levels, it becomes possible to quickly activate or delay inactivation of the participants. Faster activation avoids the cutting off of syllables or parts of syllables at the start of speaking. The delay in inactivation prevents unnecessary switching off or transfer of the participant in case of short pauses in speech.

The participant levels of the participants in a conference are compared and, for example, the three highest values are determined. These three participants are reported to the adding processor as active participants by the evaluation processor.

If all channels have been recognized as being inactive based on the evaluation of the participant levels, the channel last switched-on remains in the active state by means of a corresponding internal control through the evaluation processor in order to avoid giving the impression of a switched-off or dead line to the participants.

If more than eight participants are included in a conference call connection, the conference call assembly operates according to the same method and creates the larger conference group by cascading two or more adding processors. This order is issued by a system control. Interconnection of the adding processors is provided through a channel in the PCM coupling network.

The advantages of the invention are found in the central evaluation of the levels of all participants in one adding processor. Furthermore, the number of active participants is always constant, regardless of the size of the conference, and a damping of the conference signals is unnecessary if the number of active participants is limited to three, for example. In addition, cascading is possible where all connected participants are equally evaluated.

The foregoing is a description corresponding in substance to German Application No. P 37 06 128.3-31, dated Feb. 23, 1987, the International priority of which is being claimed for the instant application, and which is hereby made part of this application. Any material discrepancies between the foregoing specification and the aforementioned corresponding German application are to be resolved in favor of the latter.

We claim:

1. In a method of making conference call connections in computer-controlled telephone exchanges, which includes combining voice signals of conference participants on a digital basis, forming a signal of a total of speaking levels of a given number of the most active participants, distributing the signal in an undamped manner, and suppressing voice signals of the inactive participants, the improvement which comprises:

distributing a bit stream of the conference participants reaching a conference assembly through an incoming line to m adding processors having n channels each, linearizing PCM words by means of a code table, storing the PCM words in level memories for each particular participant;

forming a total of the linear values, adding the total of the linear values to individual participant evaluation totals, and storing the total of the linear values in evaluation memories for each particular participant;

transmitting the participant evaluation totals to an evaluation processor which determines active channels by using a delayed average value of the participant levels and which transmits the active channels to the adding processors;

creating a conference total signal by adding linear values of all channels;

subtracting the individual linear value of the active participants, subsequently forming transmission signals for all channels in the adding processors by compressing the conference total signal;

storing the signals thus created in transmitting memories, and transmitting the signals through an outgoing line.

2. Method according to claim 1, which comprises forming the participant evaluation total by the integration of n linearized PCM words of an adding processor.

3. Method according to claim 2, which comprises reducing the integrated participant evaluation total to 1/n after exactly n PCM frames, and adding the integrated participant evaluation total to an integrated participant level reduced to $(n-1)/n$, for the formation of a delayed average value.

4. Method according to claim 1, which comprises immediately switching a channel from an inactive state to an active state, and switching a channel from the active state into the inactive state with a delay.

5. Method according to claim 2, which comprises immediately switching a channel from an inactive state to an active state, and switching a channel from the active state into the inactive state with a delay.

6. Method according to claim 3, which comprises immediately switching a channel from an inactive state to an active state, and switching a channel from the active state into the inactive state with a delay.

7. Method according to claim 1, which comprises keeping the channel which was last switched-on in the active state, during the inactive state of all channels.

8. Method according to claim 2, which comprises keeping the channel which was last switched-on in the active state, during the inactive state of all channels.

9. Method according to claim 3, which comprises keeping the channel which was last switched-on in the active state, during the inactive state of all channels.

10. Method according to claim 4, which comprises keeping the channel which was last switched-on in the active state, during the inactive state of all channels.

* * * * *